(12) United States Patent
Vivanco et al.

(10) Patent No.: US 9,705,739 B1
(45) Date of Patent: Jul. 11, 2017

(54) SYSTEMS AND METHODS FOR CONFIGURING A UNIQUE ACCESS NODE IDENTIFIER

(71) Applicant: Sprint Spectrum LP, Overland Park, KS (US)

(72) Inventors: Daniel Vivanco, Sterling, VA (US); Chunmei Liu, Great Falls, VA (US); Krishna Sitaram, Chantilly, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 247 days.

(21) Appl. No.: 14/332,868

(22) Filed: Jul. 16, 2014

(51) Int. Cl.
H04L 12/24 (2006.01)
H04W 8/00 (2009.01)
H04W 28/02 (2009.01)
H04W 24/02 (2009.01)

(52) U.S. Cl.
CPC ......... *H04L 41/0806* (2013.01); *H04W 8/005* (2013.01); *H04W 28/0289* (2013.01); *H04L 41/0816* (2013.01); *H04W 24/02* (2013.01)

(58) Field of Classification Search
None
See application file for complete search history.

(56) References Cited

U.S. PATENT DOCUMENTS

| 8,494,526 | B2 | 7/2013 | Kallin et al. | |
|---|---|---|---|---|
| 2008/0207215 | A1* | 8/2008 | Chu | H04W 40/26 455/452.2 |
| 2010/0008235 | A1* | 1/2010 | Tinnakornsrisuphap | H04L 29/12264 370/241 |
| 2010/0075681 | A1* | 3/2010 | Olofsson | H04W 16/24 455/436 |
| 2012/0275315 | A1* | 11/2012 | Schlangen | H04W 24/02 370/242 |

FOREIGN PATENT DOCUMENTS

| CN | 101594631 A | * 12/2009 | ............ H04W 24/10 |
|---|---|---|---|
| CN | WO 2009143747 A1 | * 12/2009 | ............ H04W 24/10 |

* cited by examiner

*Primary Examiner* — Vinncelas Louis

(57) ABSTRACT

Systems and methods are described for configuring a unique access node identifier. A preliminary identifier may be assigned to a first access node. A request for information to establish a communication link between the first access node and a second access node may be received such that the request includes the preliminary access node identifier. The first access node may be instructed to discover a number of a plurality of neighbor access nodes proximate to the first access node based on the received request. Identifiers for the discovered neighbor access nodes may be determined. A second access node identifier may be assigned to the first access node that is different from the first access node identifier and the identifiers for the discovered neighbor access nodes, wherein the second access node identifier may be assigned when the number of discovered neighbor access nodes meets a criteria.

20 Claims, 8 Drawing Sheets

SYSTEMS AND METHODS FOR CONFIGURING A UNIQUE ACCESS NODE IDENTIFIER

TECHNICAL BACKGROUND

Telecommunication systems, such as cellular networks or other wireless networks, use various network links throughout the network to communicate. For example, an access node may use a network link to communicate with another access node while using a separate network link to communicate with a controller node. Accordingly, the system may rely on a well-established network to provide efficient communication services.

In certain circumstances, an access node may be unknown to proximate access nodes within the same communication system. For example, a newly established access node may not be known to its neighboring access nodes. A system designed to efficiently update access nodes about their neighboring access node would allow for an enhanced quality of service for the users of the system.

Overview

Systems and methods are described for configuring a unique access node identifier. A preliminary identifier may be assigned to a first access node. A request for information to establish a communication link between the first access node and a second access node may be received such that the request includes the preliminary access node identifier. The first access node may be instructed to discover a plurality of neighbor access nodes proximate to the first access node based on the received request. Identifiers for the discovered neighbor access nodes may be determined. A second access node identifier may be assigned to the first access node that is different from the first access node identifier and the identifiers for the discovered neighbor access nodes, wherein the second access node identifier may be assigned when the number of discovered neighbor access nodes meets a criteria.

DETAILED DESCRIPTION

Figure 1:
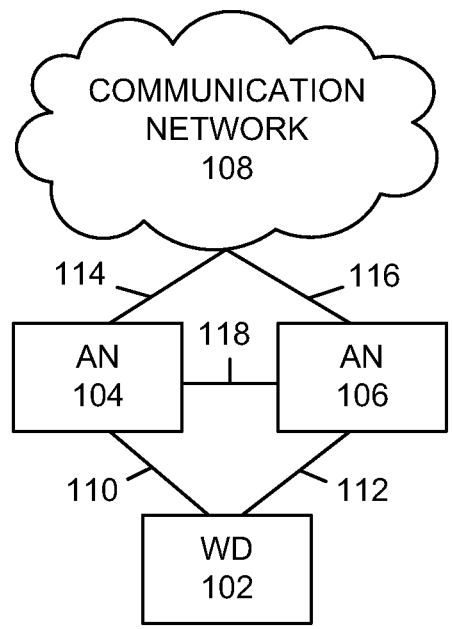
FIG. 1 illustrates an exemplary communication system to configure a unique access node identifier.

FIG. 1 illustrates an exemplary communication system 100 to configure a unique access node identifier comprising wireless device 102, access nodes 104 and 106, communication network 108, and communication links 110, 112, 114, 116, and 118. Other network elements may be present in the communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between access node 104, access node 106, and communication network 108 which are omitted for clarity, including additional processing nodes, routers, gateways, and physical and/or wireless data links for carrying data among the various network elements.

Wireless device 102 can be any device configured to communicate over communication system 100 using a wireless communication link. For example, wireless device 102 can include a cell phone, a smart phone, a computing platform such as a laptop, palmtop, or a tablet, a personal digital assistant, or an internet access device, and combinations thereof. It is noted that while one wireless device is illustrated in FIG. 1 as being in communication with each of access nodes 104 and 106, any number of wireless devices can be implemented.

Access nodes 104 and 106 are network nodes capable of providing wireless communications to wireless device 102, and can be, for example, a base transceiver station, a radio base station, an eNodeB device, or an enhanced eNodeB device. Access nodes 104 and 106 may communicate with communication network 108 over communication links 114 and 116. Access nodes 104 and 106 may also communicate directly with each other over communication link 118. In an embodiment, access node 104 can comprise a serving access node for wireless device 102.

Although only two access nodes 104 and 106 are illustrated in FIG. 1, wireless device 102 can be in communication with a plurality of access node. The plurality of access nodes can be associated with different networks and can support different communication protocols and radio access technologies.

Communication network 108 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 108 can be capable of carrying voice information and other information, for example, to support communications by a wireless device such as wireless device 102. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 108 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 108 may also comprise a wireless network, including base stations, wireless communication nodes, telephony switches, internet routers, network gateways, computer systems, communication links, or some other type of communication equipment, and combinations thereof.

Communication links 110, 112, 114, 116, and 118 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, GSM, CDMA, UMTS, HSPA, EV-DO, or 3GPP LTE, or combinations thereof. Other wireless protocols can also be used.

Figure 2:
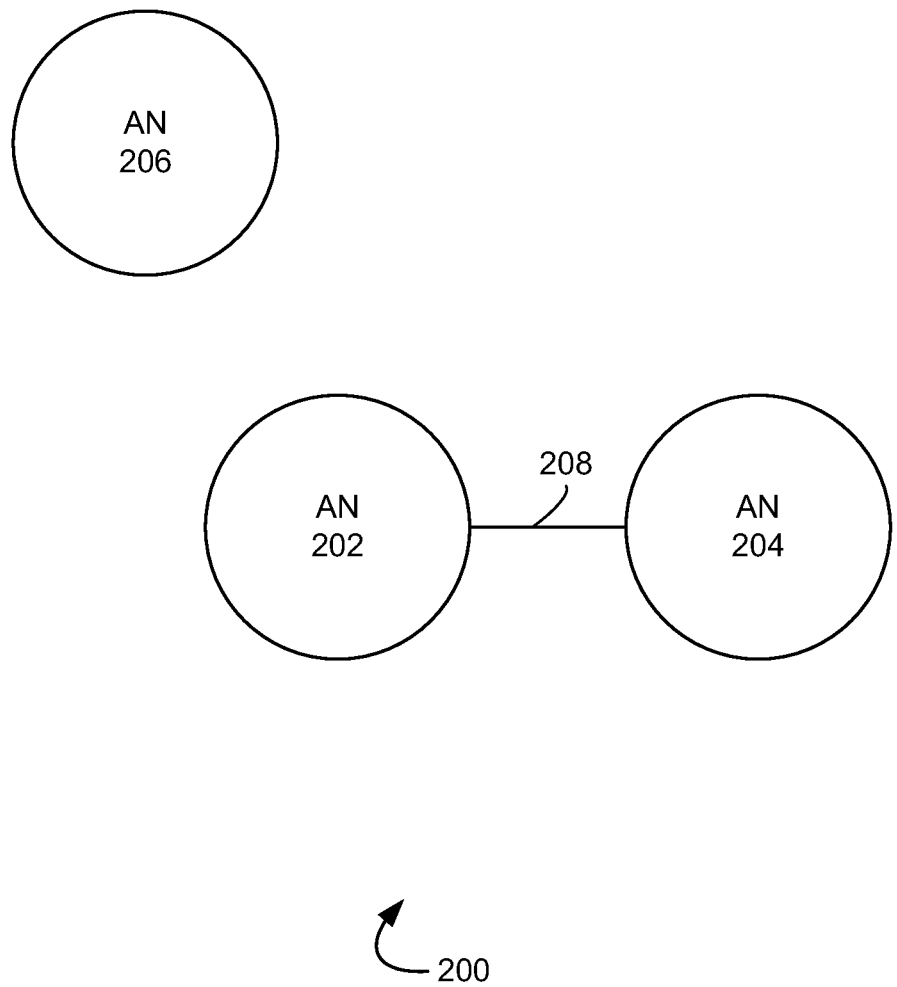
FIG. 2 illustrates another exemplary system to configure a unique access node identifier.

FIG. 2 illustrates an exemplary communication system 200 for configuring a unique access node identifier. System 200 comprises access nodes 202, 204 and 206, and communication link 208. Access nodes 202, 204 and 206 may comprise access nodes similar to access node 104 of FIG. 1. Communication link 208 may comprise a communication link similar to communication link 118 of FIG. 1.

In operation, access node 202 may establish communication with a plurality of wireless devices such that access node 202 provides the wireless devices access to a communication network (such as communication network 108, illustrated in FIG. 1). In an embodiment, communication system 200 may be configured to manage access node neighbor relations. For example, communication system 200 may implement a self-organizing network (SON) protocol that includes an automatic neighbor relations (ANR) protocol, or may implement any other suitable protocol for managing access node neighbor relations.

In an embodiment, access node 202 may not be aware of access node 204. For example, access node 202 may track neighbor access nodes using a neighbor relations table (NRT) that stores information about access node 202's neighbors. The NRT may store identifiers for neighbor access nodes (e.g., physical cell identifier (PCI), cell global identity (CGI), and the like), connection information (e.g., X2 connection information), handover information, and any other suitable neighbor information. In this example, access node 202 may not comprise an entry in the neighbor relations table for access node 204.

In an embodiment, access node 202 may comprise a new access node. In other words, access node 202 may have been connected to communication network 200 recently (e.g., within a threshold time period). In this example, access node 204 may not be aware of access node 202 because it is a new access node. Access node 202 may be configured to discover access node 204 using, for example, an ANR process.

In an embodiment, access node 202 may use wireless devices in communication with the access node in order to discover new neighbor access nodes. Here, access node 202 may transmit a criteria, such as an ANR criteria, to wireless devices in communication with access node 202. The ANR criteria may comprise a signal level criteria. An ANR event may be triggered at one of the wireless devices in communication with access node 202 based on a comparison of the received ANR signal level criteria, a signal level for a reference signal or pilot signal received from access node 202, and a signal level for a reference signal or pilot signal received from access node 204. In response to the triggered ANR event, the wireless device may transmit a measurement report comprising a signal level for each reference signal or pilot signal received at the wireless device (e.g., from a plurality of access nodes), and an identifier (e.g., PCI, CGI, and the like) for each access node. In an embodiment, the measurement report may comprise signal levels that are above a criteria (e.g., a determined threshold).

Access node 202 may receive the measurement report and compare the access node identifiers in the NRT against those in the received measurement report. Here, because access node 202 is not aware of access node 204, the NRT for access node 202 does not include information about access node 204. Accordingly, access node 202 may commence a process to add access node 204 as a neighbor (e.g., update the NRT to include information for access node 204). In an embodiment, access node 202 may instruct the wireless device to retrieve a global identifier for access node 204 and transmit the global identifier to access node 202. Using the global identifier, access node 202 may obtain an IP address for access node 204 (e.g., from a controller node such as an MME). Communication link 208 may then be established between access node 202 and access node 204 (e.g., an X2 connection). Based on this process, access node 202 may update the NRT to include information about access node 204. Here, access node 204 may comprise a discovered neighbor of access node 202.

In an embodiment, access node 202 may have been recently configured to operate on system 200. During the configuration, access node 202 may be assigned an access node identifier (e.g., physical cell identifier, PCI). The assigned identifier for access node 202 may be used for various network functions, such as handover communication, load balancing between access nodes, and the like. Because the assigned identifier is used in access node communication, in certain embodiments the identifier is assigned such that it is unique within a subset of access nodes (e.g., unique within the subset of access nodes that comprise access node 202's neighboring access nodes).

However, because access node 202 has been recently configured, the subset of neighboring access nodes may not be readily known. For example, access node 206 may comprise an unknown neighboring access node to access node 202. Accordingly, a system that discovers neighboring access nodes such that a unique identifier may be assigned to access node 202 may enhance efficient network configuration.

Systems and methods are described for configuring a unique access node identifier. A preliminary identifier may be assigned to a first access node. A request for information to establish a communication link between the first access node and a second access node may be received such that the request includes the preliminary access node identifier. The first access node may be instructed to discover a plurality of neighbor access nodes proximate to the first access node based on the received request. Identifiers for the discovered neighbor access nodes may be determined. A second access node identifier may be assigned to the first access node that is different from the first access node identifier and the identifiers for the discovered neighbor access nodes, wherein the second access node identifier may be assigned when the number of discovered neighbor access nodes meets a criteria.

Figure 3:
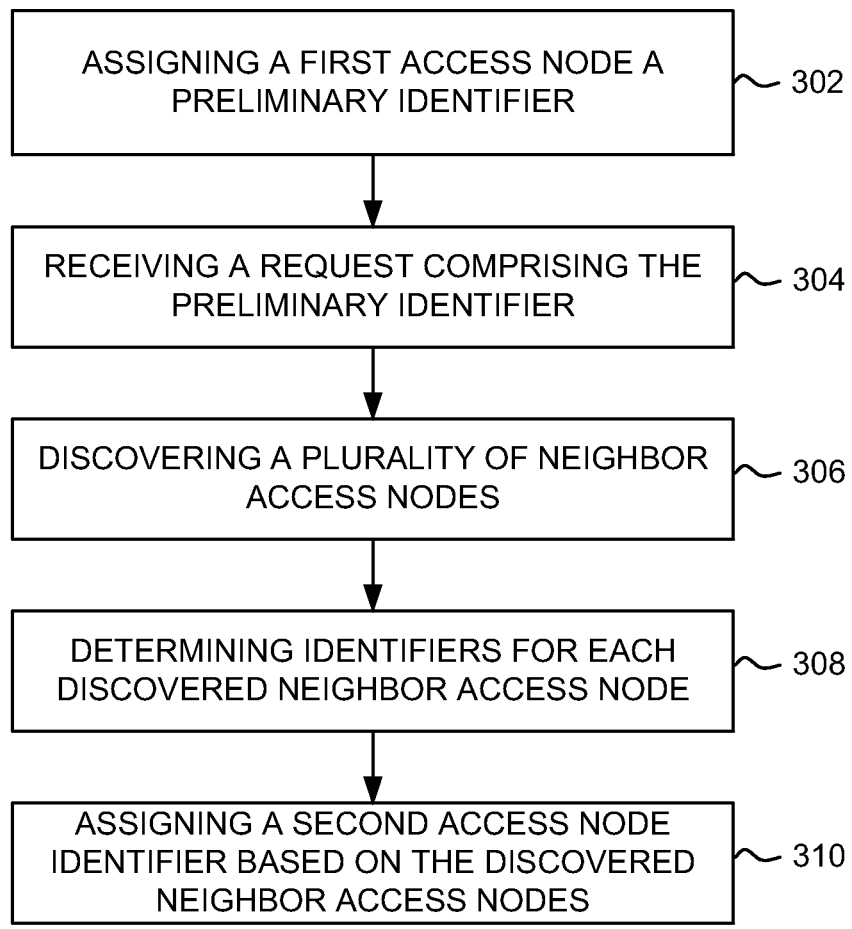
FIG. 3 illustrates an exemplary method of configuring a unique access node identifier.

FIG. 3 illustrates an exemplary method for configuring a unique access node identifier. The method will be discussed with reference to the exemplary communication system 200 illustrated in FIG. 2, however, the method can be implemented with any suitable communication system.

Referring to FIG. 3, at step 302, a first access node is assigned a preliminary identifier. For example, access node 202 may be assigned a preliminary identifier. In this example, access node 202 may comprise an access node that has been recently configured to operate on system 200. During configuration, access node 202 may be assigned a preliminary identifier, such as a PCI. For example, a subset of PCIs may be allocated as preliminary identifiers, and access node 202 may be assigned one of the subset of PCIs because access node 202 is new to system 200.

At step 304, a request may be received comprising the preliminary identifier. For example, a request to establish a communication link (e.g., an X2 connection) between access node 202 and access node 206 may be received, and the request may include the preliminary identifier assigned to access node 202. In an embodiment, the request may be a portion of an ANR process, as described herein.

At step 306, the first access node may be instructed to discover a number of a plurality of neighbor access nodes proximate to the first access node based on the received request. For example, based on the received request comprising the preliminary identifier, access node 202 may be instructed to discover a number of a plurality of neighbor access nodes proximate to access node 202. In an embodiment, access node 202 may discover the neighbor access nodes using an ANR process, as described herein. The instruction to discover neighbor access nodes may comprise an adjusted ANR signal criteria (e.g., signal level threshold) to be transmitted to wireless devices in communication with access node 202, an adjusted period at which ANR should be performed, and the like.

At step 308, identifiers may be determined for the discovered neighbor access nodes. For example, neighbor access nodes of access node 202 may be discovered, and identifiers (e.g., PCIs) may be determined for each of the discovered neighbor access nodes.

At step 310, a second access node identifier different from the first access node identifier and the identifiers for the discovered neighbor access nodes may be assigned to the first access node when the number of discovered neighbor access nodes meets a criteria. For example, a number of neighbor access nodes for access node 202 may be discovered. The number of discovered neighbor access nodes may be compared to a criteria. When the number meets the criteria, a second access node identifier (e.g., PCI) may be assigned to the first access node. In an embodiment, the second access node identifier (e.g., PCI) is different from the first access node identifier (e.g., preliminary identifier) and the identifiers for the discovered neighbor access nodes (e.g., PCIs).

Figure 4:
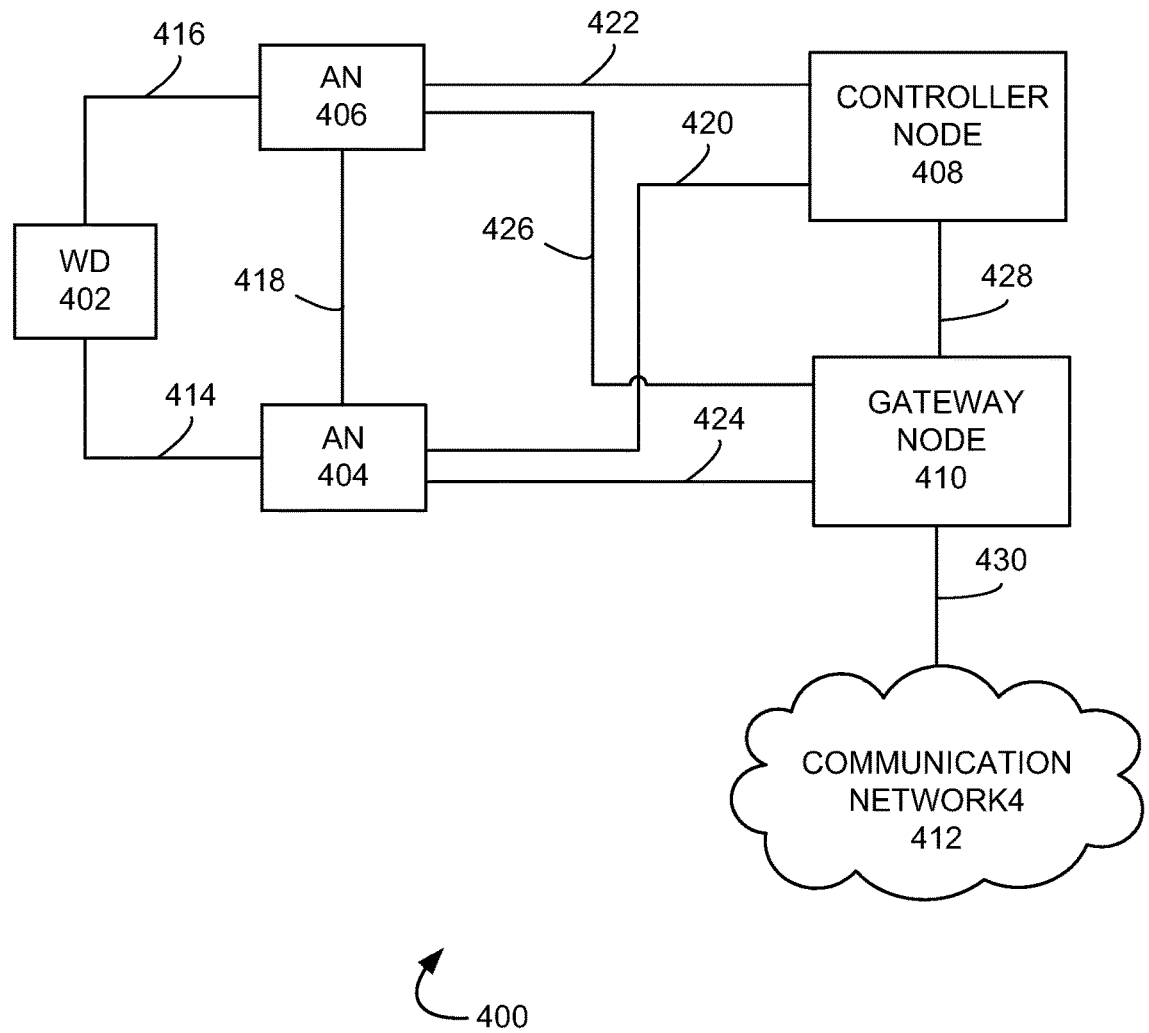
FIG. 4 illustrates another exemplary system to configure a unique access node identifier.

FIG. 4 illustrates another exemplary communication system 400 to configure a unique access node identifier. Communication system 400 may comprise a wireless device 402, access nodes 404 and 406, controller node 408, gateway node 410, communication network 412, and communication links 414, 416, 418, 420, 422, 424, 426, 428, and 430. Other network elements may be present in the communication system 400 to facilitate communication but are omitted for clarity, such as base stations, base station controllers, gateways, mobile switching centers, dispatch application processors, and location registers such as a home location register or visitor location register.

Wireless device 402 can be any device configured to communicate over communication system 400 using a wireless communication link. For example, wireless device 402 can include a cell phone, a smart phone, a computing platform such as a laptop, palmtop, or a tablet, a personal digital assistant, or an internet access device, and combinations thereof.

Access nodes 404 and 406 are network nodes capable of providing wireless communications to wireless device 402, and can be, for example, a base transceiver station, a radio base station, an eNodeB device, or an enhanced eNodeB device. In an embodiment, access node 404 can comprise a serving access node for wireless device 402. Access nodes 404 and 406 may communicate with controller node 408 over communication links 420 and 422, and with gateway node 410 over communication links 424 and 426. Access nodes 404 and 406 may also communicate directly with each other over communication link 418.

Controller node 408 can be any network node configured to manage services within system 400. Controller node 408 may provide other control and management functions for system 400. The controller node 408 can be a single device having various functions or a plurality of devices having differing functions. For example, controller node 408 can include at least one of a multi-cell/multicast coordination entity (MCE), a mobility management entity (MME), a radio network controller (RNC), a mobile switching center (MSC), and a combination thereof. In an embodiment, controller node 408 may perform all or parts of the methods of FIGS. 3, 6, and 7.

Controller node 408 can comprise a processor and associated circuitry to execute or direct the execution of computer-readable instructions to obtain information. Controller node 408 can retrieve and execute software from storage, which can include a disk drive, a flash drive, memory circuitry, or some other memory device, and which can be local or remotely accessible. The software may comprise computer programs, firmware, or some other form of machine-readable instructions, and may include an operating system, utilities, drivers, network interfaces, applications, or some other type of software, including combinations thereof. Controller node 408 can receive instructions and other input at a user interface. Controller node 408 can comprise a processor and associated circuitry to execute or direct the execution of computer-readable instructions to obtain information.

Gateway node 410 is a network element which can comprise a processor and associated circuitry to execute or direct the execution of computer-readable instructions. Gateway node 410 may retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. In an embodiment, gateway node 410 can provide instructions to access nodes 404 and 406 related to channel selection in communications with wireless device 402. For example, gateway node 410 can comprise at least one of a serving gateway (SGW), a packet data network gateway (PDNGW), a cellular gateway (CGW), and a combination thereof.

Communication network 412 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 412 may also comprise base stations, wireless communication nodes, telephony switches, internet routers, network gateways, computer systems, communication links, or some other type of communication equipment, and combinations thereof. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 412 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 414, 416, 418, 420, 422, 424, 426, 428, and 430 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), or Long Term Evolution (LTE), or combinations thereof. Other wireless protocols can also be used.

Other network elements may be present in the communication system 400 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication among access nodes 404 and 406, controller node 408, gateway node 410, and communication network 412 which are omitted for clarity, including additional processing nodes, routers, gateways, and physical and/or wireless data links for carrying data among the various network elements.

Figure 5:
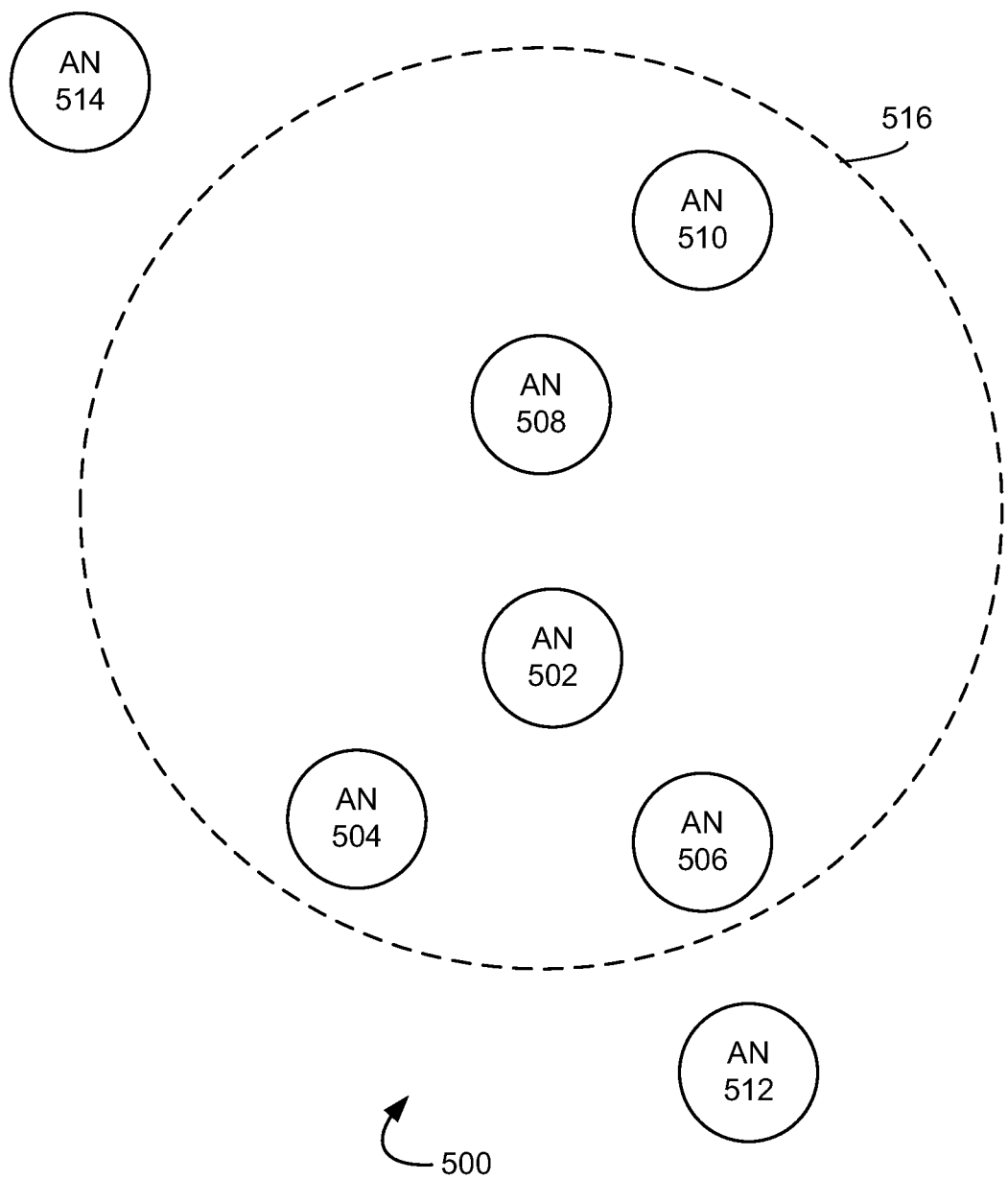
FIG. 5 illustrates exemplary systems to configure a unique access node identifier.

FIG. 5 illustrates an exemplary communication system 500 for configuring a unique access node identifier. System 500 comprises access nodes 502, 504, 506, 508, 510, 512, and 514, and tracking area 516. Access nodes 502, 504, 506, 508, 510, 512, and 514 may comprise access nodes similar to access node 404 of FIG. 4.

In operation, access node 502 may establish communication with a plurality of wireless devices such that access node 502 provides the wireless devices access to a communication network (such as communication network 412, illustrated in FIG. 4). In an embodiment, communication system 500 may be configured to manage access node neighbor relations. For example, communication system 500 may implement a self-organizing network (SON) protocol that includes an automatic neighbor relations (ANR) protocol, or may implement any other suitable protocol for managing access node neighbor relations.

In an embodiment, access node 502 may not be aware of access node 504. For example, access node 502 may track neighbor access nodes using a neighbor relations table (NRT) that stores information about access node 502's neighbors. The NRT may store identifiers for neighbor access nodes (e.g., PCI, CGI, eCGI, and the like), connection information (e.g., X2 connection information), handover information, and any other suitable neighbor information. In this example, access node 502 may not comprise an entry in the neighbor relations table for access node 504.

In an embodiment, access node 502 may comprise a new access node. In other words, access node 502 may have been connected to communication network 500 recently (e.g., within a threshold time period). In this example, access node 504 may not be aware of access node 502 because it is a new access node. Access node 502 may be configured to discover access node 504 using, for example, an ANR process.

In an embodiment, access node 502 may use wireless devices in communication with the access node in order to discover new neighbor access nodes. Here, access node 502 may transmit a criteria, such as an ANR criteria, to wireless devices in communication with access node 502. The ANR criteria may comprise a signal level criteria. An ANR event may be triggered at one of the wireless devices in communication with access node 502 based on a comparison of the received ANR signal level criteria, a signal level for a reference signal or pilot signal received from access node 502, and a signal level for a reference signal or pilot signal received from access node 504. In response to the triggered ANR event, the wireless device may transmit a measurement report comprising a signal level for each reference signal or pilot signal received at the wireless device (e.g., from a plurality of access nodes), and an identifier (e.g., PCI, CGI, and the like) for each access node. In an embodiment, the measurement report may comprise signal levels that are above a criteria (e.g., a determined threshold).

Access node 502 may receive the measurement report and compare the access node identifiers in the NRT against those in the received measurement report. Here, because access node 502 is not aware of access node 504, the NRT for access node 502 does not include information about access node 504. Accordingly, access node 502 may commence a process to add access node 504 as a neighbor (e.g., update the NRT to include information for access node 504). In an embodiment, access node 502 may instruct the wireless device to retrieve a global identifier for access node 504 and transmit the global identifier to access node 502. Using the global identifier, access node 502 may obtain an IP address for access node 504 (e.g., from a controller node such as an MME). A communication link may then be established between access node 502 and access node 504 (e.g., an X2 connection). Based on this process, access node 502 may update the NRT to include information about access node 504. Here, access node 504 may comprise a discovered neighbor of access node 502.

In an embodiment, access node 502 may have been recently configured to operate on system 500. During the configuration, access node 502 may be assigned an access node identifier (e.g., physical cell identifier, PCI). The assigned identifier for access node 502 may be used for various network functions, such as handover communication, load balancing between access nodes, and the like. Because the assigned identifier is used in access node communication, in certain embodiments the identifier is assigned such that it is unique within a subset of access nodes (e.g., unique within the subset of access nodes that comprise access node 502's neighboring access nodes).

However, because access node 502 has been recently configured, the subset of neighboring access nodes may not be readily known. For example, access node 506 may comprise an unknown neighboring access node to access node 502. Accordingly, a system that discovers neighboring access nodes such that a unique identifier may be assigned to access node 502 may enhance efficient network configuration.

Figure 6:
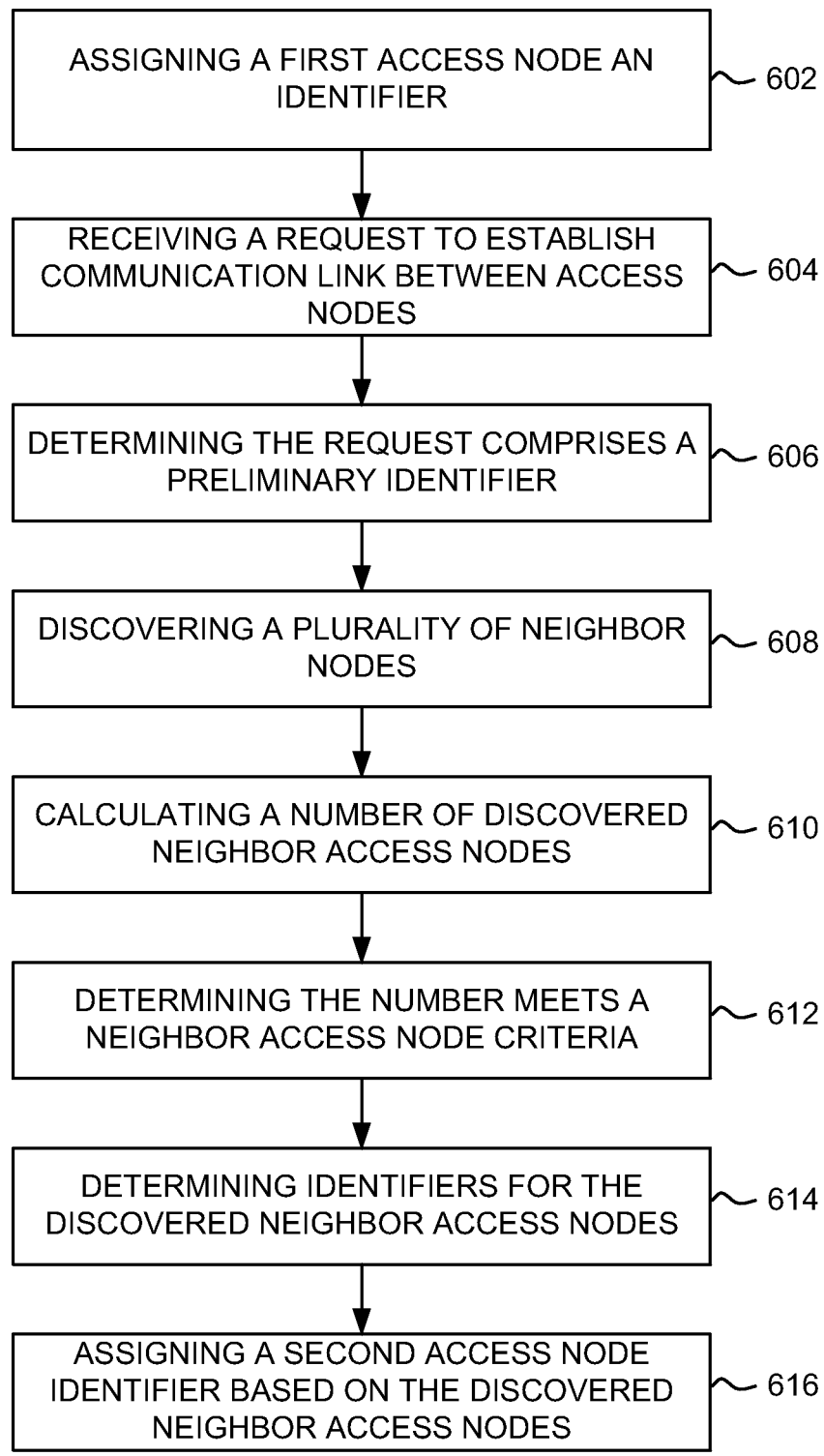
FIG. 6 illustrates another exemplary method of configuring a unique access node identifier.

FIG. 6 illustrates an exemplary method for configuring a unique access node identifier. The method will be discussed with reference to the exemplary communication system 500 illustrated in FIG. 5, however, the method can be implemented with any suitable communication system.

Referring to FIG. 6, at step 602, a first access node is assigned a first access node identifier. For example, access node 502 may be assigned a first access node identifier. In this example, access node 502 may comprise an access node that has been recently configured to operate on system 500. During configuration, access node 502 may be assigned a preliminary identifier, such as a preliminary PCI. For example, a subset of PCIs may be allocated as preliminary identifiers, and access node 502 may be assigned one of the subset of PCIs because access node 502 is new to system 500. In an embodiment, the first access node identifier may comprise a PCI, a global identifier (e.g., eCGI, GUTI, and the like), or any other suitable identifier.

At step 604, a request may be received comprising the first access node identifier. For example, a request to establish a communication link (e.g., an X2 connection) between access node 502 and access node 506 may be received, and the request may include the first access node identifier assigned to access node 502. In an embodiment, the request may be a portion of an ANR process, as described herein. In another embodiment, the request may comprise any suitable request related to an access node neighbor relations process, such as the ANR process described herein, that comprises the first access node identifier.

At step 606, it is determined that the first access node identifier comprises a preliminary access node identifier. For example, access node 502 may be assigned a first access node identifier that comprises a preliminary access node identifier. In an embodiment, a subset of identifiers (e.g., PCIs) may be allocated as preliminary identifiers, and access node 502 may be assigned one of the subset of PCIs because access node 502 is new to system 500. In another embodiment, the first access node identifier may comprise a character or sequence of characters that denote that the identifier comprises a preliminary access node identifier. Here, it may be determined that the first access node identifier comprises a preliminary access node identifier.

At step 608, the first access node may be instructed to discover a plurality of neighbor access nodes proximate to the first access node based on the determination that the first access node identifier comprises a preliminary access node identifier. For example, based on the determination that the first access node identifier comprises a preliminary access node identifier, access node 502 may be instructed to discover a plurality of neighbor access nodes proximate to access node 502. In an embodiment, access node 502 may discover the neighbor access nodes using an ANR process, as described herein. The instruction to discover neighbor access nodes may comprise an adjusted ANR signal criteria (e.g., signal level threshold) to be transmitted to wireless devices in communication with access node 502, an adjusted period at which ANR should be performed, and the like.

In an embodiment, access node 502 may discover neighbor access nodes based on the neighbor access nodes performing instructions, such as instructions that comprise an adjusted ANR signal criteria (e.g., signal level threshold) to be transmitted to wireless devices in communication with the neighbor access nodes, an adjusted period at which ANR should be performed, and the like. For example, access node 502 may be configured to fall within tracking area 516. A tracking area may comprise a portion of network 500 used for various network functions (e.g., wireless device paging during idle mode). A tracking area may comprise a plurality of access nodes. Accordingly, the access nodes within tracking area 516 (e.g., access nodes 504, 506, 508 and 510) may receive instructions related to an ANR process such that access node 502 may discover neighbor access nodes proximate to access node 502. In an embodiment, access nodes that fall within a geographic region (e.g., within a threshold distance from access node 502) may receive these ANR related instructions. Accordingly, access node 512 may receive the ANR related instructions even though access node 512 does not fall within tracking area 516 because access node 512 is within a threshold distance from access node 502. However access node 514 may not receive the ANR related instructions because access nodes 514 does not fall within tracking area 516 and is not within a threshold distance from access node 502.

In an embodiment, access nodes that comprise neighbors to the neighbors of access node 502 may receive the ANR related instructions. For example, as described herein, an ANR process may be performed such that access node 504 comprises a neighbor of access node 502 (e.g., the NRT for access node 502 includes an entry for access node 504). In this example, neighbors of access node 504 may receive the ANR related instructions. Here, access node 506 may comprise a neighbor to access node 504, and therefore access node 506 may receive the ANR related instructions. As access node 502 discovers a new neighbor, the neighbors of the new neighbor may receive the ANR related instructions. For example, once access node 506 performs the ANR related instructions, access nodes 502 may add access node 506 as a neighbor (e.g., implementing an ANR process as described herein). Based on the new neighbor relationship with access node 502, the neighbors of access node 506 (e.g., access node 512) may receive the ANR related instructions. In an embodiment, once an access node is discovered as a neighbor access node to access node 502, it may no longer perform the ANR related instructions since access node 502 has already discovered the access node as a neighbor.

In an embodiment, the ANR related instructions may comprise sharing neighbor information. For example, once access node 504 is added as a neighbor to access node 502, both access nodes may be instructed to share neighbor information (e.g., information from the NRT for each access node). In an embodiment, each discovered neighbor access node may similarly be instructed to share neighbor information with access node 502.

In an embodiment, access node 502 may discover neighbor access nodes over a period of time. For example, access node 502 and other relevant access nodes, as described herein, may perform ANR related instructions that cause access node 502 to discover neighbor access nodes over a period of time (e.g., minutes, hours, and the like). The period of time may be based on the number of access nodes in tracking area 516, the number of access nodes within a threshold distance of access node 502, and the like. In an embodiment, the period of time may be based on a network congestion for the first access node (e.g., the congestion at a portion of the network that comprises the first access node). For example, based on a time of day, an anticipated network congestion near access node 502 (e.g., during a busy hour) may reduce the period of time that ANR related instructions are performed by access node 502 and other relevant access nodes, as described herein. In an embodiment, after the period of time, access node 502 and other relevant access nodes, as described herein, may no longer perform the ANR related instructions. The method of FIG. 7 may further describe step 608.

At step 610, a number of discovered neighbor access nodes may be calculated. For example, a number of discovered neighbor access nodes for access node 502 may be calculated. In an embodiment, the number of discovered neighbor access nodes may comprise the access nodes that include an entry in the NRT for access node 502.

At step 612, it may be determined that the number of neighbor access nodes meets a neighbor access node criteria. For example, a number of discovered neighbor access nodes for access node 502 may be compared to a neighbor access node criteria (e.g., threshold number of neighbor access nodes). The neighbor access node criteria may be based on the number of access nodes in tracking area 516, the average number of neighbor access nodes for the neighbors of access node 502, the average number of neighbor access nodes for the access nodes within tracking area 516, the network congestion at a portion of the network that comprises node 502, and the like. In an embodiment, when the number of discovered neighbor access nodes for access node 502 does not meet the neighbor access node criteria, the period of time for discovering neighbor access nodes may be extended.

At step 614, identifiers may be determined for the discovered neighbor access nodes. For example, neighbor access nodes of access node 502 may be discovered, and identifiers (e.g., PCIs) may be determined for each of the discovered neighbor access nodes. Here, access nodes 504, 506, 508, and 510 may be discovered as neighbor access nodes to access node 502 (e.g., using an ANR process as described herein). Accordingly, identifiers for each of these access nodes may be determined. The identifiers may be determined based on the NRT for access node 502, or any other suitable means.

In an embodiment, identifiers may be determined for the neighbors of the discovered neighbors for access node 502. Here, access nodes 504, 506, 508, and 510 may be discovered as neighbor access nodes to access node 502 (e.g., using an ANR process as described herein). Access node 512 may not comprise a neighbor to access node 502, but may comprise a neighbor to access node 506. Accordingly, because access node 506 is a neighbor to access node 502 and because access node 512 is a neighbor to a neighbor of access node 502 (e.g., a neighbor to access node 506), an identifier for access node 512 may be determined.

At step 616, a second access node identifier different from the first access node identifier and the identifiers for the discovered neighbor access nodes may be assigned to the first access node when the number of discovered neighbor access nodes meets the neighbor access node criteria. For example, a number of neighbor access nodes for access node 202 may be discovered. The number of discovered neighbor access nodes may be compared to the neighbor access node criteria. When the number meets the criteria, a second access node identifier (e.g., PCI) may be assigned to the first access node.

In an embodiment, the second access node identifier (e.g., PCI) is different from the first access node identifier (e.g., preliminary PCI) and the identifiers for the discovered neighbor access nodes (e.g., PCIs). In another embodiment, the second access node identifier (e.g., PCI) is different from the first access node identifier (e.g., preliminary PCI), the identifiers for the discovered neighbor access nodes (e.g., PCIs), and the identifiers for the neighbors of the discovered neighbor access nodes (e.g., PCIs). The second access node identifier may comprise an identifier that is not a preliminary identifier (e.g., a PCI that is not allocated as a preliminary PCI).

Figure 7:
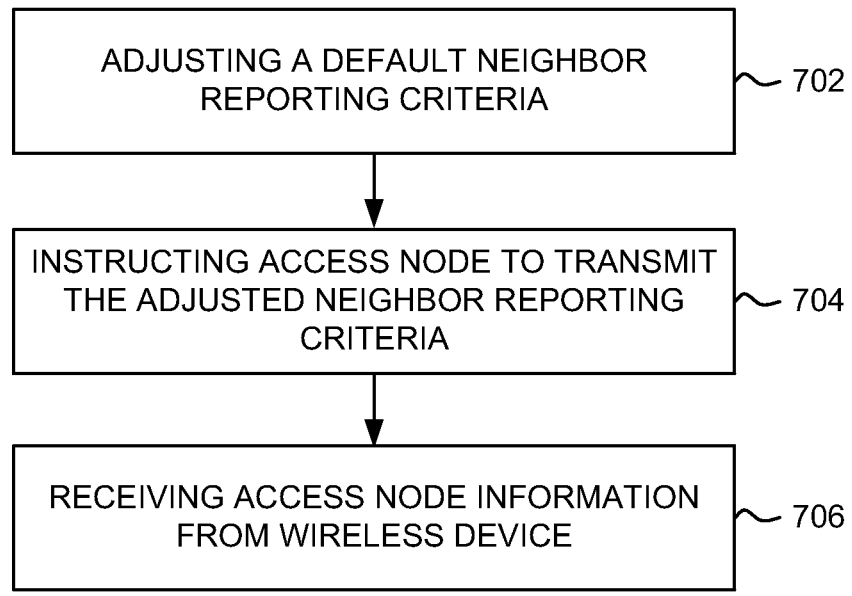
FIG. 7 illustrates another exemplary method of configuring a unique access node identifier.

FIG. 7 illustrates an exemplary method for determining an access node for a wireless device. Step 608 of the method of FIG. 6 may further comprise the method of FIG. 7. The method will be discussed with reference to the exemplary communication system 500 illustrated in FIG. 5, however, the method can be implemented with any suitable communication system.

Referring to FIG. 7, at step 702, a default neighbor reporting criteria may be adjusted. For example, a neighbor reporting criteria may comprise a signal level threshold that may be transmitted to wireless devices. The neighbor reporting criteria may be adjusted such that the signal level threshold is reduced. In an embodiment, a wireless device may receive a source reference signal from a source access node (e.g., serving access node) at a source signal level and a target reference signal from a target access node at a target signal level. When the target signal level meets the reduced signal level threshold, a reporting event may be triggered at the wireless device such that the wireless device transmits a report (e.g., ANR related report) that comprises a target access node identifier to the source access node. Accordingly, the adjusted neighbor reporting criteria may cause a reporting event to be triggered at a wireless device when a target signal level meets a reduced threshold signal level. Here, an ANR process, as described herein, may be encouraged based on the adjusted neighbor reporting criteria.

At step 704, access nodes may be instructed to transmit the adjusted neighbor reporting criteria to wireless devices in communication with the access nodes. For example, access node 502 may be instructed to transmit the adjusted neighbor reporting criteria to wireless devices in communication with access node 502. In another example, access node proximate to access node 502 may be instructed to transmit the adjusted neighbor reporting criteria to wireless devices in communication with the access nodes. These access nodes proximate to access node 502 may comprise access nodes within tracking area 516, access nodes that comprise neighbors to the neighbors of access node 502, access nodes within a geography region (e.g., within a threshold distance from access nodes 502), access nodes that receive ANR related instructions, as described herein with reference to FIG. 6, and any other suitable access nodes.

At step 706, access node information may be received from at least one wireless device that received the adjusted neighbor reporting criteria. For example, where access node 502 transmitted the adjusted neighbor reporting criteria to wireless devices in communication with access node 502, at least one of the wireless devices may transmit a report that comprises an identifier for a target access node. Here, the target access node may not comprise an entry in the NRT for access node 502, and, based on the ANR process as described herein, the target access node may become a discovered neighbor access node to access node 502. Where an access node proximate to access node 502 transmitted the adjusted neighbor reporting criteria to wireless devices in communication with the access node (e.g., an access node within tracking area 516, a neighbor to a neighbor access node of access node 502, an access node within a threshold distance from access node 502, and the like), at least one of the wireless devices may transmit a report that comprises an identifier for access node 502. Here, the proximate access node may not comprise an entry in the NRT for access node 502, and, based on the ANR process as described herein, the proximate access node may become a discovered neighbor access node to access node 502.

Although the methods described perform steps in a particular order for purposes of illustration, the methods discussed herein are not limited to any particular order or arrangement. One skilled in the art, using the disclosure provided herein, will appreciate that various steps of the methods can be omitted, rearranged, combined, and/or adapted in various ways.

Figure 8:
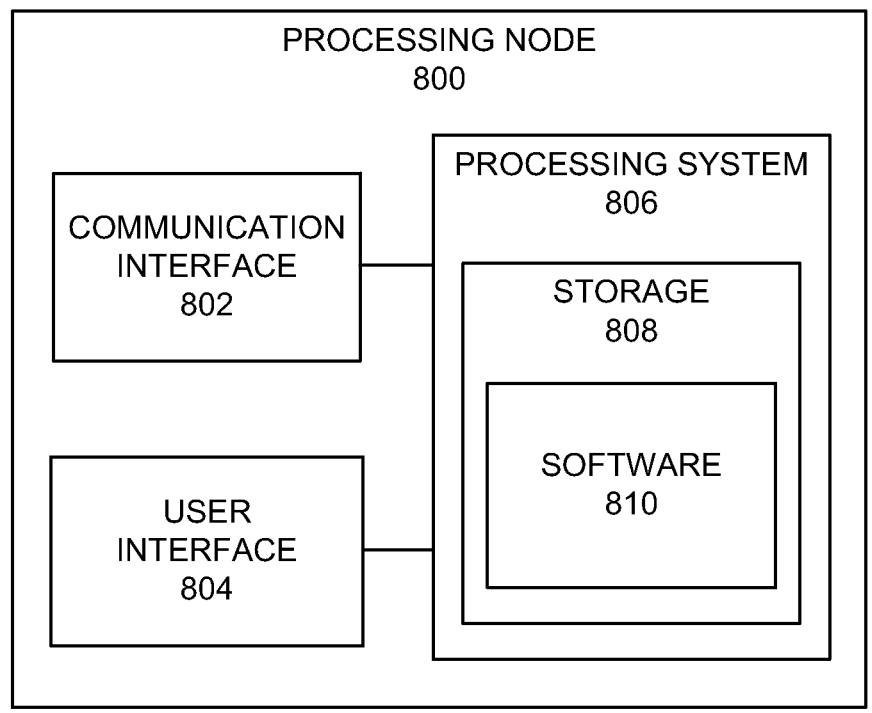
FIG. 8 illustrates an exemplary processing node.

FIG. 8 illustrates an exemplary processing node 800 in a communication system. Processing node 800 comprises communication interface 802, user interface 804, and processing system 806 in communication with communication interface 802 and user interface 804. Processing node 800 can be configured to determine a communication access node for a wireless device. Processing system 806 includes storage 808, which can comprise a disk drive, flash drive, memory circuitry, or other memory device. Storage 808 can store software 810 which is used in the operation of the processing node 800. Storage 808 may include a disk drive, flash drive, data storage circuitry, or some other memory apparatus. Software 810 may include computer programs, firmware, or some other form of machine-readable instructions, including an operating system, utilities, drivers, network interfaces, applications, or some other type of software. Processing system 806 may include a microprocessor and other circuitry to retrieve and execute software 810 from storage 808. Processing node 800 may further include other components such as a power management unit, a control interface unit, etc., which are omitted for clarity. Communication interface 802 permits processing node 800 to communicate with other network elements. User interface 804 permits the configuration and control of the operation of processing node 800.

Examples of processing node 800 include controller node 408 and gateway node 410. Processing node 800 can also be an adjunct or component of a network element, such as an element of access nodes 104, 106, 404, or 406. Processing node 800 can also be another network element in a communication system. Further, the functionality of processing node 800 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for configuring a unique access node identifier using a preliminary access node identifier, the method comprising:
    assigning a preliminary access node identifier to a first access node;
    receiving a request for information to establish a communication link between the first access node and a second access node, the request comprising the preliminary access node identifier;
    instructing, based on the request comprising the preliminary access node identifier, the first access node to discover a number of a plurality of neighbor access nodes proximate to the first access node by instructing the first access node to transmit an adjusted neighbor reporting criteria to at least a first wireless device such that the adjusted neighbor reporting criteria instructs the first wireless device to decrease a signal level threshold used to trigger a neighbor report from the first wireless device;
    determining an identifier for each of the discovered neighbor access nodes; and
    assigning, after receiving one or more neighbor reports from the first wireless device, a second access node identifier different from the preliminary access node identifier and the identifiers for the discovered neighbor access nodes to the first access node when the number of discovered neighbor access nodes meets a discovered neighbor criteria, wherein the discovered neighbor criteria comprises a threshold such that, when the number of discovered neighbor access nodes meets or exceeds the threshold, the preliminary access node identifier is replaced by the second access node identifier.

2. The method of claim 1, further comprising:
    reserving a group of preliminary access node identifiers to assign to new access nodes; and
    assigning one of the group of preliminary access node identifiers to the first access node when the first access node is initialized for communication with a network.

3. The method of claim 1, further comprising:
    establishing a communication link between the first access node and a second access node based on the received request; and
    instructing the second access node to send to the first access node information about the plurality of neighbor access nodes over the established communication link.

4. The method of claim 3, further comprising:
    establishing a communication link between the first access node and each discovered neighbor access node; and
    instructing each discovered neighbor access node to send to the first access node information about the plurality of neighbor access nodes over each respective established communication link.

5. The method of claim 1, wherein assigning the second access node identifier different from the preliminary access node identifier and the identifiers for the neighbor access nodes to the first access node further comprises:
    determining access node identifiers for neighbors of the discovered neighbor access nodes; and
    determining the second access node identifier for the first access node such that the second access node identifier is different from the identifiers for the discovered neighbor access nodes and from the identifiers for the neighbors of the discovered neighbor access nodes.

6. The method of claim 1, further comprising:
    receiving information about one of the discovered neighbor access nodes from the first wireless device when a signal level from the one discovered neighbor access node detected at the wireless device meets the adjusted neighbor reporting criteria.

7. The method of claim 1, further comprising:
instructing a plurality of access nodes proximate to the first access node to transmit the adjusted neighbor reporting criteria to a plurality of wireless devices; and
receiving, at the plurality of access nodes proximate to the first access node, information about the first access node from the plurality of wireless devices based on neighbor reporting triggered at the plurality of wireless devices by the adjusted neighbor reporting criteria.

8. The method of claim 1, wherein discovering the plurality of neighbor access nodes proximate to the first access node is performed over a period of time.

9. The method of claim 8, wherein the period of time is based on network congestion for the first access node.

10. The method of claim 1, wherein the neighbor reporting criteria is based on an average number of neighbors for the discovered neighbor access nodes.

11. A system for configuring a unique access node identifier using a preliminary access node identifier, the system comprising:
a processing node with a processor, the processing node being configured to:
assign a preliminary access node identifier to a first access node;
receive a request for information to establish a communication link between the first access node and a second access node, the request comprising the preliminary access node identifier;
instruct, based on the request comprising the preliminary access node identifier, the first access node to discover a number of a plurality of neighbor access nodes proximate to the first access node by instructing the first access node to transmit an adjusted neighbor reporting criteria to at least a first wireless device such that the adjusted neighbor reporting criteria instructs the first wireless device to decrease a signal level threshold used to trigger a neighbor report from the first wireless device;
determine an identifier for each of the discovered neighbor access nodes; and
assign, after receiving one or more neighbor reports from the first wireless device, a second access node identifier different from the preliminary access node identifier and the identifiers for the discovered neighbor access nodes to the first access node when the number of discovered neighbor access nodes meets a discovered neighbor criteria, wherein the discovered neighbor criteria comprises a threshold such that, when the number of discovered neighbor access nodes meets or exceeds the threshold, the preliminary access node identifier is replaced by the second access node identifier.

12. The system of claim 11, further comprising:
reserving a group of preliminary access node identifiers to assign to new access nodes; and
assigning one of the group of preliminary access node identifiers to the first access node when the first access node is initialized for communication with a network.

13. The system of claim 11, wherein the processing node is further configured to:
establish a communication link between the first access node and a second access node based on the received request; and
instruct the second access node to send to the first access node information about the plurality of neighbor access nodes over the established communication link.

14. The system of claim 13, wherein the processing node is further configured to:
establish a communication link between the first access node and each discovered neighbor access node; and
instruct each discovered neighbor access node to send to the first access node information about the plurality of neighbor access nodes over each respective established communication link.

15. The system of claim 11, wherein assigning the second access node identifier different from the preliminary access node identifier and the identifiers for the neighbor access nodes to the first access node further comprises:
determining access node identifiers for neighbors of the discovered neighbor access nodes; and
determining the second access node identifier for the first access node such that the second access node identifier is different from the identifiers for the discovered neighbor access nodes and from the identifiers for the neighbors of the discovered neighbor access nodes.

16. The system of claim 11, wherein the processing node is further configured to:
receive information about one of the discovered neighbor access nodes from the first wireless device when a signal level from the one discovered neighbor access node detected at the first wireless device meets the adjusted neighbor reporting criteria.

17. The system of claim 11, wherein the processing node is further configured to:
instruct a plurality of access nodes proximate to the first access node to transmit the adjusted neighbor reporting criteria to a plurality of wireless devices; and
receive, at the plurality of access nodes proximate to the first access node, information about the first access node from the plurality of wireless devices based on neighbor reporting triggered at the plurality of wireless devices by the adjusted neighbor reporting criteria.

18. The system of claim 11, wherein discovering the plurality of neighbor access nodes proximate to the first access node is performed over a period of time.

19. The system of claim 18, wherein the period of time is based on network congestion for the first access node.

20. A method for configuring a unique access node identifier using a preliminary access node identifier, the method comprising:
assigning a first access node identifier to a first access node;
receiving a request for information to establish a communication link between the first access node and a second access node, the request comprising the first access node identifier;
determining the first access node identifier comprises a preliminary access node identifier;
discovering a plurality of neighbor access nodes proximate to the first access node based on the determination that the first access node identifier comprises a preliminary access node identifier, wherein the discovering comprises transmitting an adjusted neighbor reporting criteria to at least a first wireless device such that the adjusted neighbor reporting criteria instructs the first wireless device to decrease a signal level threshold used to trigger a neighbor report from the first wireless device;
calculating a number of neighbor access nodes discovered;
determining identifiers for the discovered neighbor access nodes; and assigning, after receiving one or more neighbor reports from the first wireless device, a second access node identifier different from the first access node identifier and the identifiers for the discovered neighbor access nodes to the first access node when the number of discovered neighbor access nodes meets a discovered neighbor criteria, wherein the discovered neighbor criteria comprises a threshold such that, when the number of discovered neighbor access nodes meets or exceeds the threshold, the preliminary access node identifier is replaced by the second access node identifier.

\* \* \* \* \*